Nov. 4, 1930.  J. M. MAYHALL ET AL  1,780,597
LIQUID TESTING DEVICE
Filed Oct. 4, 1926
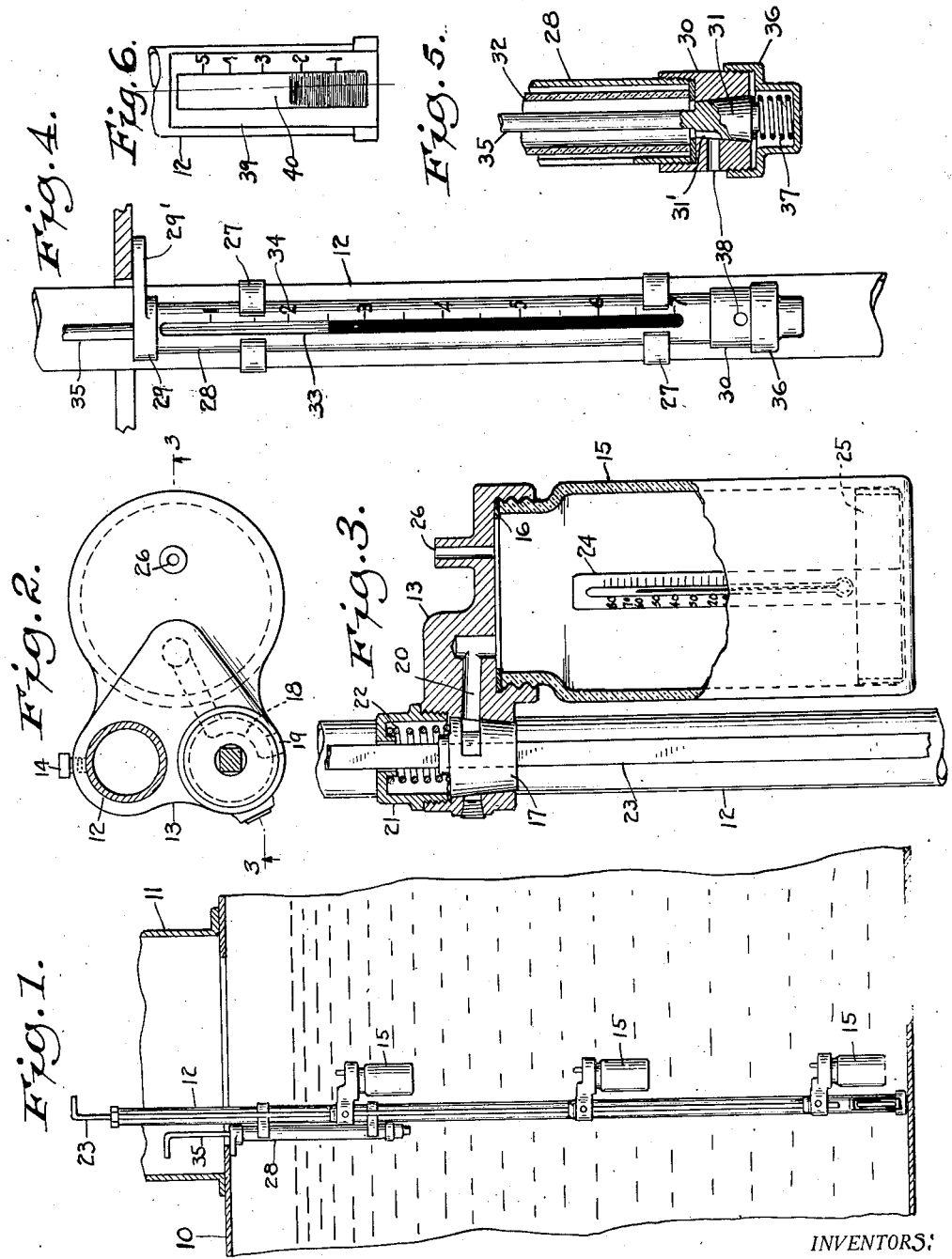
INVENTORS:
JOHN M. MAYHALL
HOWARD C. MORRISON
BY
WITNESS:
ATTORNEYS.

Patented Nov. 4, 1930

1,780,597

UNITED STATES PATENT OFFICE

JOHN M. MAYHALL AND HOWARD C. MORRISON, OF MILWAUKEE, WISCONSIN

LIQUID-TESTING DEVICE

Application filed October 4, 1926. Serial No. 139,373.

The device has been designed specifically for the purpose of making certain desirable tests in connection with tank cars, with a view to the ascertainment of the condition of the contents thereof, but is capable of like use in other relations. In tank cars containing certain grades of oils or their derivatives, variations in quality are found to exist, such variations being due to many causes.
The present invention resides in a simply constructed, efficient device, which may readily be inserted through the man-hole of a tank car, and an accurate indication made thereon of the several conditions existing in the contents of the tank. From these several indications, the true value of the contents may be determined.

The invention comprises a construction embodying a staff for immersion in the contents of the tank, such staff carrying a plurality of detachable receptacles of small capacity which by submersion may be filled with samples of the oil or other substance in the tank, taken at different levels from the bulk, so as to permit ascertainment of any variations in the quality thereof. The detachable feature of the "thiefs", permits their quick replacement by other receptacles, so that the device may be made serviceable in testing the contents of a very large number of tanks with a minimum expenditure of time.

Each such receptacle is provided upon its inside with a thermometer, which after the immersion has been made, will indicate the temperatures of the contents of the tank existing at the levels from which the samples are drawn.

The device is further provided with an ullage indicator, which accurately indicates whatever shrinkage or loss of bulk may have taken place between the time that the tank was filled and the making of the test.

Still further, the device is provided with a means for ascertaining the quantity, if any, of water underlying the contents of the tank.

The novel features of the invention will now be particularly described, and then set forth in the appended claims.

In the accompanying drawing:
Figure 1 is a view in elevation of our testing device, showing the same as positioned within an oil tank for the purpose of securing samples and ascertaining the temperature of the contents at different levels, the ullage loss, and the presence of water, if any, at the bottom of the tank.

Fig. 2 is a plan view, enlarged, of one of the supports or caps for the receptacles, showing its relation to the staff, and the arrangement of the inlet valve.

Fig. 3 is an enlarged view in elevation, partly in section on the line 3—3, Fig. 2, showing a convenient manner of supporting the receptacle on the staff, and the construction of the inlet valve.

Fig. 4 is a view in elevation of the ullage indicator.

Fig. 5 is a vertical sectional view of the lower end thereof, showing the construction of the inlet valve.

Fig. 6 is a view in elevation of a device applied at the lower end of the staff of the testing device, to determine the quantity of water at the bottom of the tank.

In the drawing, the numeral 10 indicates the shell of a tank car or other container adapted to the transportation or storage of oil or its derivatives, the said tank being provided with an usual inlet or man-hole 11.

The numeral 12 indicates a staff, preferably constituted as a light metal tube, of suitable length to enable it when inserted in the tank to rest upon the bottom thereof and extend some distance above the top thereof. Supports 13 of the outline shown in Fig. 2, are bored for the reception of the staff 12, on which a plurality of such supports may be adjusted in spaced relation by means of set screws 14, the points of which pass laterally through the supports 13 and bear upon the staff 12. In the construction illustrated, we have shown three of such supports, spaced about equal distances apart. At its underside, the support is formed with a large threaded recess into which may be screwed the neck of a wide mouth bottle or receptacle 15, a seal being effected between the rim of the bottle mouth and the bottom of the recess in the support 13, by means of a gasket 16.

In line with the opening which receives the staff 12, the support 13 is bored for the reception of a valve mechanism, serving as an inlet to the receptacle 15. At its lower part the said bore in the support 13 is tapered in the manner shown in Fig. 3, to form a seat for a tapering plug 17, which latter is provided with a partly circumferential passage 18 connecting with an opening 19 in the adjacent outer side of the support 13, the said passage 18 being adapted to connect the opening 19 with a duct 20 formed in the support 13, and leading to the receptacle 15. Above the plug 17 the opening in the support is threaded for the reception of the lower end of a cap 21, which confines an expansion spring 22 and causes the plug 17 to remain in its seat.

The several valves 17 carried by the staff 12 are aligned, and each is provided with a central opening for the reception of a valve rod 23, so connected to the several plugs that all may be operated to open or close the several inlets by a partial rotation of the valve rod. A convenient manner of effecting the connection between the several valves and the valve rod will be to form the rod as a polygon in cross section and correspondingly form the central holes in the plugs 17. When adjustment of the supports 13 upon the staff is made, the separate valve mechanisms will slide on the valve rod 23. By turning the valve rod so as to bring the passage 18 out of register with the duct 20, the inlet to the receptacle 15 will be closed. A reverse movement of the valve rod 23 so as to bring the passage 18 into register with the duct 20, will open the receptacle 15 to the flow of oil in the tank. After a time sufficient for the receptacle to be filled, the valves may be closed.

Each receptacle is provided with a thermometer 24 to indicate the temperature of the contents of the tank at different levels at which the samples are taken. The thermometer 24 may be positioned in the receptacle 15 by means of a light spring 25 which by expansion will engage the inside of the receptacle, and which permits easy insertion and removal. The supports 13 are each provided with a vent 26 with which a connection leading to the atmosphere may be made, so that the air within the receptacle may find an egress with the inflow of the oil. The receptacles 15 are readily detachable, and after the tests have been made and the samples secured, such receptacles may be removed and set aside for analysis of their contents, and other receptacles applied to the device, which latter may be immediately used in making a test in another tank.

Frictionally held upon the staff 12 by curved springs 27, so as to slide thereon, is an ullage detector positioned as shown in Fig. 1. The ullage detector comprises a metallic tube 28, having at its upper end a cap 29 provided with a lateral finger 29′, adapted to be brought into engagement with the underside of the shell 10 at the man-hole. The lower end of the tube 28 is provided with a cap 30, which is bored to form a seat for a valve 31, formed as a tapering plug. A glass tube 32 is arranged within the metallic tube 28, the latter being provided with a sight opening 33 and a scale 34. The plug 31 is provided with a stem 35 extending through the glass tube 32 and is guided in the cap 29, from which latter it projects upwardly to a position of convenient operation. A hollow cap 36 is screwed upon the lower end of the cap 30 and confines an expansion spring 37, the latter acting to maintain the plug 31 in its seat. A duct 38 leading from the exterior of the cap 30 to a groove 31′ in the plug, will permit passage of the oil in the tank into the glass tube 32, upon turning the valve stem 35 so as to bring the duct and groove into register. The oil so admitted will rise immediately to the level of that in the tank, and the valve 31 is closed by turning the valve stem to disalign the duct and groove. The vacant space in the glass tube 32 above the sample thus drawn, indicates accurately upon the scale 34 the extent of the ullage. By pulling on the valve stem 35, the finger 29′ may be moved along the staff 12, and made to engage the shell of the tank, after the lower end of the staff has been placed in contact with the bottom of the tank. By turning the valve stem 35 after inspection, the trapped sample in the glass tube 32, may be allowed to escape, and the instrument is then ready for another testing operation.

The lower end of the staff is provided with a slit 39 in which may be inserted a slip of litmus paper 40 to detect the amount of water, if any, lying at the bottom of the tank.

The device as a whole is light and portable, and enables the desired tests to be efficiently made in a simple manner. It may be immersed in the tank without agitation of the contents thereof. Details of construction may be variously modified without departing from the scope of the claims. The manner illustrated of attaching the demountable receptacles 15 to their supports on the staff 12, is a convenient one. The receptacles 15 are preferably of clear glass, and their threaded necks facilitate the application of sealing covers to preserve the sample contents against disturbance or loss. The use of clear glass receptacles will allow the thermometer to be disposed within the receptacle, and permit visualization of what is recorded thereon.

Having thus described our invention, what we claim and desire to secure by Letters Patent of the United States, is:

1. A liquid testing device comprising a staff supporting a plurality of detachable receptacles for submersion in a bulk of oil to obtain samples at different levels, and normally closed valve devices associated with the several receptacles for permitting flow from the bulk into the receptacles, with means for operating the valves in unison.

2. A liquid testing device comprising a staff and a plurality of receptacle supports thereon, in combination with receptacles detachably connected to the supports in spaced relation, valves carried by the said supports, and means for operating the valves, to permit flow therethrough into the receptacles when the receptacles are submerged.

3. A liquid testing device comprising a staff and a plurality of receptacle supports thereon, a plurality of detachable receptacles supported in spaced relation by the said receptacle supports for submersion in a bulk of oil to obtain samples thereof at different levels, valves and operating means therefor to permit flow from the bulk into the receptacles, and a thermometer supported within each receptacle to register the temperature of the bulk at the levels from which the samples are taken.

4. A liquid testing device comprising a staff and a plurality of spaced supports thereon, in combination with a plurality of detachable receptacles mounted upon the staff through said supports to draw samples of the liquid at different levels, each such support being provided with a valve for controlling the flow into the receptacle and also with a vent for the latter.

5. A device for testing liquid in tank cars and the like, comprising a staff supporting a plurality of spaced receptacles for taking samples of the bulk of liquid at different levels, and means movable on the staff for determining the ullage in the same testing operation.

6. A device for testing liquids in tank cars, comprising a staff supporting a plurality of spaced receptacles for taking samples of the bulk of liquid at different levels, in combination with an ullage indicator supported upon the staff, the said ullage indicator having a tube and means permitting rise of the liquid into the tube for indicating the level of the liquid in the tank in the same testing operation.

7. A device for testing liquids in tank cars, comprising a staff supporting a plurality of spaced receptacles for taking samples of the bulk of liquid at different levels, in combination with an ullage indicator supported upon the upper part of the staff and adapted to engage the under side of the shell of the tank at the man-hole, the said detector comprising a transparent tube and a valve at the bottom thereof, and means for operating the said valve to permit the liquid in the tank to seek its level in the tube, and so indicate the ullage.

In testimony whereof, we have signed our names at Milwaukee, this 2d day of October, 1926.

JOHN M. MAYHALL.
H. C. MORRISON.